United States Patent [19]
Campbell

[11] Patent Number: 4,831,627
[45] Date of Patent: May 16, 1989

[54] ENERGY GENERATOR

[75] Inventor: Jonathan L. Campbell, Encino, Calif.

[73] Assignees: Adam Dukovic, Westminster; Albert O. Cota, Granada Hills; Lyle Sardie, Lakewood, all of Calif.

[21] Appl. No.: 226,665

[22] Filed: Aug. 1, 1988

[51] Int. Cl.$^4$ .............................................. H01S 3/00
[52] U.S. Cl. ...................................... 372/37; 372/1; 372/69; 372/55
[58] Field of Search .................... 372/37, 1, 69, 55, 92

[56] References Cited
U.S. PATENT DOCUMENTS 3,961,197  6/1976  Dawson ................................ 372/37
4,504,954  3/1985  Gürs et al. ............................ 372/61

Primary Examiner—Leon Scott, Jr.
Attorney, Agent, or Firm—Albert O. Cota

[57] ABSTRACT

An energy generator (10) that converts matter in the form of a gas into an energy source. The generator functions by injecting a gas, such as hydrogen, into a confined chamber (12). The chamber includes an annular permanent magnet (30) and a rotating magnetic assembly (32) that includes a plurality of magnetic fins (36) that form a funnel shape. The combination of the magnets (30), (36) serves to accelerate and centrifugally confine and cause the gas molecules to collide with one another until they acquire sufficient energy to cause lasing.

13 Claims, 1 Drawing Sheet

ENERGY GENERATOR

TECHNICAL FIELD

The invention pertains to the general field of energy generators and more particularly to an apparatus and method for converting molecular gas particles into light energy.

BACKGROUND ART

Ever since man learned to use fire, he has constantly sought new and more efficient sources of energy. Most early energy sources converted matter into energy by burning matter which was relatively inefficient and resulted in substantial quantities of waste material, such as ash, which accumulated and required allocation of space and effort for disposal of such water. More recently, with the discovery of atomic fission and lasing, energy sources have been provided which yield far greater energy than previous energy sources. Moreover, at least with lasers, the waste materials readily recombine with other particles so that waste disposal problems are greatly reduced and in many cases eliminated. Nevertheless, the search for new and more efficient energy sources continues.

A search of the prior art did not disclose any patents that read directly on the claims of the instant invention. However, the following U.S. patent was considered related:

| U.S. PAT. NO. | INVENTOR | ISSUED |
|---|---|---|
| 4,504,954 | Guers, etal | 12 March 1985 |

For background purposes and as indicative of the art to which the invention relates, reference may be made to the following remaining patents found in the search:

| PATENT NUMBER | INVENTOR | ISSUED |
|---|---|---|
| 3,014,183 | Berk, etal | 19 Dec. 1961 |
| 3,244,993 | Schloemann | 5 Apr. 1966 |
| 3,258,703 | Moore | 28 Jun. 1966 |
| 3,379,985 | Matsuno | 23 Apr. 1968 |
| 3,681,710 | Lary, etal | 1 Aug. 1972 |

The patent to Guers et al relates to a laser system having a stationary magnet encircling a housing within which is a laser mechanism including a rotating member for circulating fluid through the lasing chamber.

DISCLOSURE OF THE INVENTION

In light of the continuing search for new and improved energy sources, the instant invention discloses an apparatus and method for converting a gas into an energy source. The instant invention functions by introducing an active gas or gases into a confined chamber having an annular magnet and a rotating magnetic assembly that includes a set of magnetic fins. Within the rotating magnetic assembly, the active gas molecules are centripetally confined and are allowed to excite unrestricted. This unrestricted molecular excitement continues until such time that the molecules are magnetically forced, by the velocity and density created by the rotating assembly, towards a point where their activity is restricted to a more confined and focused area. Within this confined area, a molecular alignment of the molecules occurs that allows centrifugal separation of the negative ions from the nuclei.

It will be understood by those skilled in the art that ionized hydrogen molecules are the lightest such ions and, hence, these ions will require a minimum magnetic field to accelerate, confine and focus them. Obviously, other ions could be used if the magnetic fields produced are sufficiently strong.

In accordance with the instant invention, the chamber with the rotating assembly serves to accelerate the activity of the hydrogen molecules negatively charged particles by the introduction of a positively charged magnetic field and to centripetally confine the molecules within a series of transitional phases that take place within the chamber cavity. The agitation and collision of the molecules is restricted within defined limits to thus, produce a magnetic funnel where the molecules are forced towards the "impact" area of the cylinder. In the impact area, the negative ions are aligned and move towards the attracting magnetic walls of the cylinder which then allows the negative ions to be separated, from their orbit, due to the centrifugal pulling force that is placed upon the hydrogen molecules, resulting in a release of energy.

Accordingly, it is the primary objective of the instant invention to disclose an improved apparatus and method for generating energy.

Another objective of the instant invention is to provide an apparatus and method for converting gas molecules into light energy.

A further object of the instant invention is to provide an apparatus and method for establishing and amplifying lasing action from injected gas molecules.

A specific object of the instant invention is to provide an apparatus and method for converting matter into energy, using a suitable gas that is injected into a chamber having a rotating magnetic cylinder. Within the chamber, a sufficiently strong magnetic field is created to centripetally confine collision of the molecules and accelerate centrifugal activity to thus cause a release of energy.

Another specific object of the instant invention is to provide an apparatus and method for creating a magnetic funnel where unrestricted collision of the molecules is controlled by centripetal confinement of the molecules to regions of molecular alignment.

A further object of the instant invention is to provide an apparatus and method that can operate with magnets having either a + to − or a − to + polarity orientation.

These and other objects of the present invention will become apparent from the following detailed description of the preferred embodiment and the appended claims taken in conjunction with the accompanying drawings.

BEST MODE FOR CARRYING OUT THE INVENTION

Figures 1, 2:
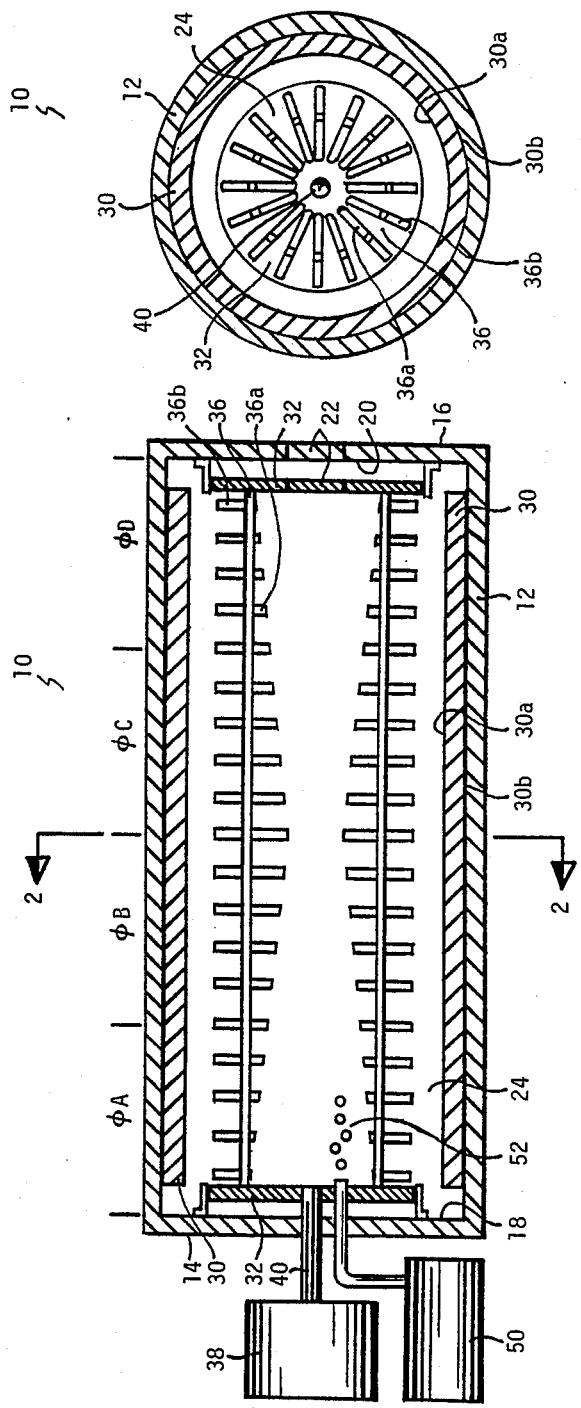
FIG. 1 is a diagrammatic longitudinal section through an energy generator embodying the instant invention.
FIG. 2 is a transverse section through the chamber of FIG. 1 taken on the line 2—2 of FIG. 1.

The best mode for carrying out the apparatus and method of the energy generator is presented in a preferred embodiment that is primarily designed to inject molecules of a suitable gas, such as hydrogen, into a chamber containing an annular permanent magnet that cooperates with a rotating magnetic assembly to produce a rotating magnetic field. The magnetic field is oriented radially with respect to the chamber's axis and serves to centripetally confine the molecules collisions within defined limits and align the nagative ions of the molecules towards the oppositively charged walls of an inner chamber. Within the rotating magnetic assembly, centrifugal separation of the molecules is accelerated to thus cause a release of energy.

The preferred embodiment of the energy generator 10 as shown in FIGS. 1 and 2, is comprised of the following major elements: a chamber 12, an annular permanent magnetic 30, a rotating magnetic assembly 32, a set of magnetic fins 36, a motor 38 and a gas source 50.

The chamber 12, as shown in FIG. 1, is a generally cylindrical hollow member that is provided with a closed end 14 and an opposite end 16 that form a lasing cavity 24. The closed end 14 is preferably provided with a fully silvered surface 18 while the opposite end 16 has a partially silvered surface 20 that includes a central area having an aperture 22 means from where the released energy is emitted.

The annular permanent magnet 30 is mounted within the chamber 12 adjacent to the wall of the chamber while the rotating magnetic assembly 32 is located concentrically within the chamber 12 for rotation by the motor 38 via a drive shaft 40. The annular permanent magnet 30 is mounted with its magnetic field radially oriented so that its north pole is on its inner surface 30a and its south pole on its outward surface 30b. However, this magnet, as well as the fin magnets 36, may be mounted with their magnetic polarity reversed.

As best seen in FIG. 2, the rotating assembly 32 includes a plurality of the generally fin-like, permanent magnets 36 mounted longitudinally and having an inward section 36a and an outward section 36b. These magnets have their magnetic field radially oriented with their north poles oriented inwardly and their south pole oriented outwardly. Additionally, as seen in FIG. 1, the inwardly facing magnets 36a are selected in length so that a funnel shape is mechanically produced. This funnel aides to force the molecules towards the impact area of the cylinder.

The gas source 50, which may utilize any active gas, with hydrogen preferred, serves to inject a stream of positively ionized gas molecules into the chamber 12. The gas molecules are generally injected axially within the rotating magnetic assembly 32, as seen at 52 in FIG. 1.

When the hydrogen gas molecules are injected into the chamber 12, by an injection means, the velocity of the rotating magnetic assembly 32 and the collisions induced by the magnetic fins 36, serves to centripetally confine and force the molecules towards the axis of the chamber 12. As the molecules enter the axis of the chamber, they travel through a set of transitional phases A, B, C and D, as shown in FIG. 1. Through these phases, the number of collisions each molecule encounters with other molecules increases, thereby causing the molecules atomic structure to weaken; thus permitting the magnet 30 and fins 36 of the rotating assembly 32 to exert a greater influence on the molecular alignment. At the assemblies greatest point of magnetic density, the molecules negative ions are centrifugally separated causing a release of energy. The release of this energy results in a spontaneous amplified emission of coherent light that is emitted through the aperture 22 located at the end 16 of the chamber 12.

If the closed end 14 of the chamber 12 has a fully silvered surface 18, and the end 16 has a partially silvered surface 20, said surfaces cooperate to form a lasing cavity 24. Within this lasing cavity, multiple reflections of the light photons, emitted by the gas molecules cause additional lasing. As is well known, a portion of the resulting light energy will pass through the aperture 22 on the partially silvered surface 20 for use as desired.

If the aperture 22 in end 16 of the chamber 12 is closed, as by a laser mirror, it may be found that continued operation of the energy generator 10 may result in a buildup of "debris" from the reactions occurring within the chamber 12 which may interfere with ongoing operations. To avoid this occurrence, it may be desirable to leave the aperture 22 exposed to permit venting of such "debris" and to mount a magnetic lens (not shown) external to the chamber 12 immediately adjacent of the aperture 22 to allow the light emanating from the chamber 12 to be focused.

Within the chamber 12, the separation of the negative ions from the hydrogen molecules are considered as occurring in the multiple transitional phases. These phases, as described infra, are regions in which molecular alignment occurs, thereby dependent on the variable length, height and width of the magnet 30 located within the chamber 12 and the quantity of magnetic fins 36. Furthermore, the transitional phases are further defined as periods of time of molecular transitions from which each hydrogen molecule is subjected to a multiplicity of varying conditions and activities.

Upon the introduction of the hydrogen gases into the phase A of the chamber, an unrestricted molecule collision and agitation occurs. As the hydrogen molecules enter transitional phase B, the confined environment created by the dense magnetic field increases and there is a corresponding increase in the centripetal force placed upon the molecules which, in turn, increases the frequency of collisions and agitations. As the hydrogen molecules are pulled towards the axis of the chamber 12, the negative ions will align towards the positive magnetic field created by the velocity of the rotating assembly 30 and magnetic imbalance of the magnetic fins 36a while the protons, will align towards the center of the magnetic field.

As the molecules are further pushed towards the center of the chamber 12 by the centripetal force of the rotating magnetic field and the dense magnetic imbalance, they will approach the "impact area", that occurs close to the interface of phases B and C. At this point, a maximum centripetal force is placed on the molecules causing a substantially total molecular alignment of the hydrogen molecules with the axis of the chamber 12. In essence, the magnetic field follows the funnel shape of the magnets 36a where unrestricted collision of the molecules is controlled by the centripetal confinement.

At the interface of phases B and C, the activity becomes centrifugal in nature with agitation and oscillation of the molecules becoming more evident. At this point, the molecules undergo maximum converstion of matter to energy. Thereafter, each interval of movement through phase C increases the centrifugal separation of the ions.

In phase D, total separation and alignment has occurred and most of the original mass has been converted to light energy protons which are reflected, in a resonant manner, by the mirrored surfaces 18, 20 as is well known in laser technology. As the protons resonate between the mirrored surfaces 18, 20, the protons interact with previously unreacted hydrogen molecules to cause additional lasing. Finally, a portion of the protons' energy escapes through the aperture 22 to provide a laser energy output from the chamber 12.

While the invention has been described in complete detail and pictorially shown in the accompanying drawings, it is not to be limited to such details, since many changes and modifications may be made to the invention without departing from the spirit and scope thereof. For example, the permanent magnet 30 could easily be replaced by an electromagnet operating from an a-c power source. Hence, it is described to cover any and all modifications and forms which may come within the language and scope of the claims.

I claim:

1. An energy generator comprising;
   (a) a chamber forming a lasing cavity having an annular magnet mounted within and adjacent to the wall of said chamber,
   (b) magnetic means having a magnetic field oriented radially with respect to the axis of said chamber,
   (c) motor means for rotating said magnetic means about the axis of said chamber, and
   (d) an active gas source means injected into said chamber to supply ionized gas molecules to said chamber within said magnetic field such that said annular magnet and said magnetic means accelerate and centrifugally confine the gas molecules causing said molecules to collide with one another until sufficient energy is aquired to cause lasing.

2. The energy generator as specified in claim 1 wherein said magnetic means comprises:
   (a) a generally cylindrical rotating magnetic assembly having its axis thereof coinciding with the axis of said chamber and mounted for rotation by said motor means, and
   (b) a plurality of generally fin-like permanent magnets mounted longitudinally on said assembly.

3. An energy generator comprising:
   (a) a chamber having an annular permanent magnet mounted within and adjacent to the wall of said chamber,
   (b) a rotating magnetic assembly located concentrically within said chamber and having a plurality of fin-like permament magnets,
   (c) a motor means for rotating said magnetic assembly about the axis of said chamber, and,
   (d) a gas source means mounted to supply ionized gas molecules into said chamber within a magentic field located therein such that said annular permanent magnet and said rotating magnetic assembly accelerate and centrifugally confine the gas molecules causing said molecules to collide with one another until sufficient energy is aquired to produce spontaneous amplified emission.

4. The energy generator as specified in claim 3 wherein said annular permanent magnet is mounted with its magnetic field radially oriented and polarized to re-enforce the magnetic field provided by said rotating magnetic assembly.

5. The energy generator as specified in claim 4 wherein said annular permanent magnet is mounted with its north pole on its inner surface.

6. The energy generator as specified in claim 4 wherein said annular permanent magnet and said fin-like permanent magnets may be mounted with their magnetic polarities reversed.

7. The energy generator as specified in claim 3 wherein said fin-like permanent magnets are mounted longitudinally and have an inward section and an outward section with the magnetic field radially oriented.

8. The energy generator as specified in claim 7 wherein said fin-like permanent magnets facing inwardly are selected in length so that a funnel shape is mechanically produced.

9. The energy generator as specified in claim 3 wherein said fin-like permanent magnets have their north pole oriented inwardly toward the axis of said chamber.

10. The energy generator is specified in claim 3 wherein said chamber is provided with a closed end having a fully silvered surface and an opposite end having a partially silvered surface that includes a central area having an aperture means from where released energy is emitted.

11. The energy generator as specified in claim 3 wherein said gas source supplies positively ionized gas molecules into said chamber.

12. A method of generating energy comprising the steps of:
    (a) generating an elongated, radially oriented magnetic field within a chamber,
    (b) rotating a magnetic assembly about the axis of said chamber to thus produce a rotating magnetic field that cooperates with said radially oriented magnetic field, and,
    (c) injecting ionized gas molecules into said rotating magnetic assembly.

13. The method as specified in claim 12 wherein said magnetic field from said chamber and said rotating magnetic assembly is sufficiently strong to centripetally confine and force the molecules towards the axis of said chamber within a set of transitional phases where the molecules accelerate centrifugally to cause a release of energy.

* * * * *